(12) United States Patent
Zielke et al.

(10) Patent No.: US 9,964,559 B2
(45) Date of Patent: May 8, 2018

(54) CROSS TRACK ERROR CALCULATION FROM ACTIVE LIGHT SENSORS

(71) Applicant: Ag Leader Technology, Ames, IA (US)

(72) Inventors: Roger Zielke, Huxley, IA (US); Chad Fick, Story City, IA (US)

(73) Assignee: Ag Leader Technology, Ames, IA (US)

( * ) Notice: Subject to any disclaimer, the term of this patent is extended or adjusted under 35 U.S.C. 154(b) by 307 days.

(21) Appl. No.: 14/823,525

(22) Filed: Aug. 11, 2015

(65) Prior Publication Data

US 2016/0041263 A1 Feb. 11, 2016

Related U.S. Application Data

(60) Provisional application No. 62/035,590, filed on Aug. 11, 2014.

(51) Int. Cl.
| | |
|---|---|
| *G01C 3/08* | (2006.01) |
| *G01P 5/00* | (2006.01) |
| *G01S 17/46* | (2006.01) |
| *A01B 69/04* | (2006.01) |

(52) U.S. Cl.
CPC ............. *G01P 5/00* (2013.01); *G01S 17/46* (2013.01); *A01B 69/008* (2013.01)

(58) Field of Classification Search
CPC .............................. G01S 17/46; A01B 69/008
USPC ......................................................... 356/4.01
See application file for complete search history.

(56) References Cited

U.S. PATENT DOCUMENTS

| | | | |
|---|---|---|---|
| 5,279,068 A * | 1/1994 | Rees ................... | A01B 69/001 180/169 |
| 5,585,626 A | 12/1996 | Beck et al. | |
| 5,837,997 A * | 11/1998 | Beck ........................ | G01J 1/04 250/222.1 |
| 2015/0359163 A1* | 12/2015 | Nelson, Jr. ........... | A01B 69/007 701/28 |

* cited by examiner

*Primary Examiner* — Mark Hellner
(74) *Attorney, Agent, or Firm* — Davis, Brown, Koehn, Shors & Roberts, P.C.

(57) ABSTRACT

Disclosed is apparatus for determining cross track error between a stored planted location and the actual physical location of plants. An array of active light sensors is mounted on a vehicle for travel above the plants. The array of active light sensors generate an electrical signal from each sensor corresponding to the reflected light from the sensor. A computer system generates a reflectance curve from the array of sensors to determine the location of a plant below the array of sensors and also generates the cross track error.

12 Claims, 2 Drawing Sheets

CROSS TRACK ERROR CALCULATION FROM ACTIVE LIGHT SENSORS

This application claims priority to U.S. Patent Application Ser. No. 62/035,590, filed Aug. 11, 2014, which is incorporated herein in its entirety by this reference.

BACKGROUND OF THE INVENTION

Current guidance systems assume that guidance lines created with GPS are a true reflection of the actual planting lines. Reducing error from GPS drift by adding options such as Real-time kinematic (RTK) correction will help create a very repeatable guidance line, but does not take into account the small errors that occur during the planting or application process. If there is an accidental shift during planting, the guidance line will indicate the rows were planted straight, but the plants will emerge shifted.

Additionally, GPS units may track slightly differently between GPS units creating a slightly different guidance line placement between planter and application equipment. Each of these instances of variation from the calculated guidance line would be corrected by a sensor controlled guidance line which responds to the plant location rather than assume planted location.

Many sidedress applicators know of these issues and choose to manually guide the equipment through the field rather than let an error in GPS guidance destroy a large section of their plants. The problem with this is human error can also cause incidental drift which will also lead to damage of plants.

U.S. Pat. No. 5,585,626 divulges the idea of using light sensors for guidance assistance, but does not provide any details on how to determine actual row location.

Current systems calculate cross track error based on where it is assumed the rows will be at. Using light sensors, the cross track error will be created from accurate measurements of the physical location of the plant row.

SUMMARY OF THE INVENTION

The disclosed implementations consists of an array of active light sensors mounted on an agricultural vehicle and an associated computer system for detecting the actual location of plants in a row and computing the difference between the actual row location from the location generated during planting using a GPS system. The array of active light sensors and associated computer system determines the location of a plant in a row by identifying a peak reflectance value which corresponds to the center of the plant. The sensors and associated computer system are able to distinguish desired crop plants from foreign vegetation, such as weeds, and to disregard sensor readings from the foreign vegetation. The sensors and associated computer system are able to distinguish between soil and vegetation readings and disregard soil readings so as to identify rows of plants and to disregard sensor readings of temporary abrupt changes in vegetation location that are caused by unintended seed placement or errant plant growth.

The sensors and associated computer system are, in preferred embodiments, interconnected with an automatic steering system to steer an agricultural vehicle along the path of the actual row of plants or to a parallel GPS manual guidance system to assist in guiding the operator along the path of the actual row of plants.

In another preferred embodiment, the sensors and associated computer system can more accurately detect the path of the plants compared to the direction of travel of the vehicle by using at least two sensor arrays over the same rows. The system would be able to more quickly respond to changes in path direction by calculating the difference in location between a front mounted and rear mounted array. The system could then predict the path direction very near to the current location of the vehicle, which is especially useful for detecting when rows of plants start to curve.

In another preferred embodiment, the sensors and associated computer system use an array of active light sensors mounted on a vehicle to determine the lateral position of vegetation relative to a ground engaging member of the vehicle and determines a crow-track driving error.

DETAILED DESCRIPTION

Figure 1:
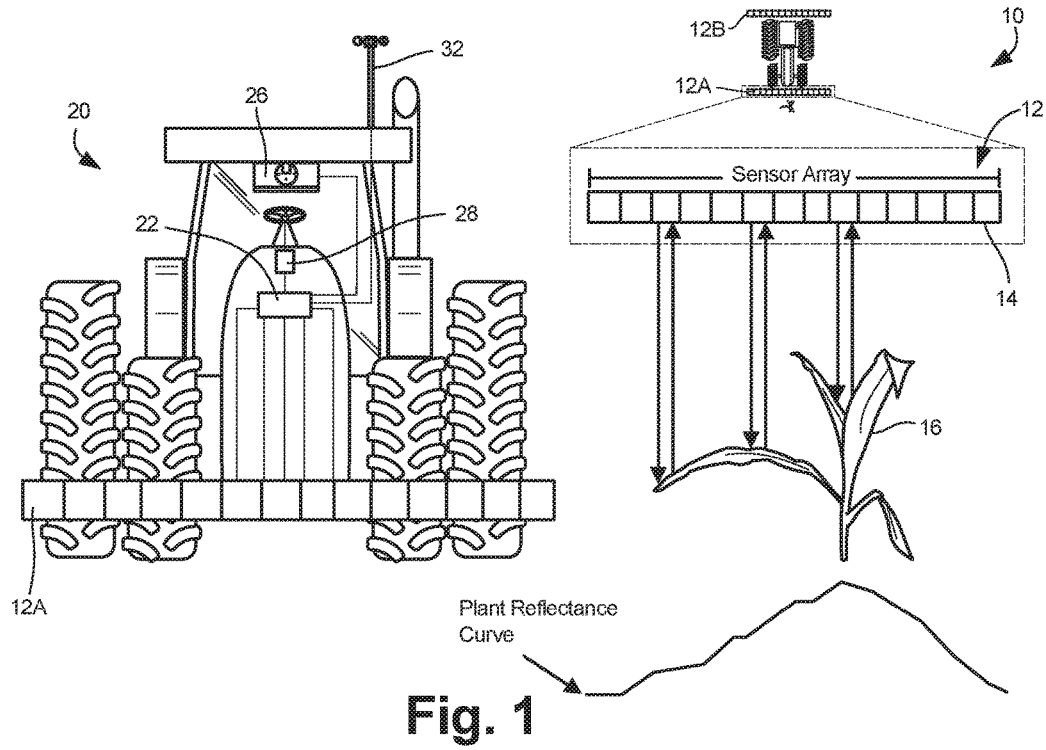
FIG. 1 is a schematic diagram of an array of sensors scanning a single plant to create a reflectance curve, according to one implementation.
Figure 3:
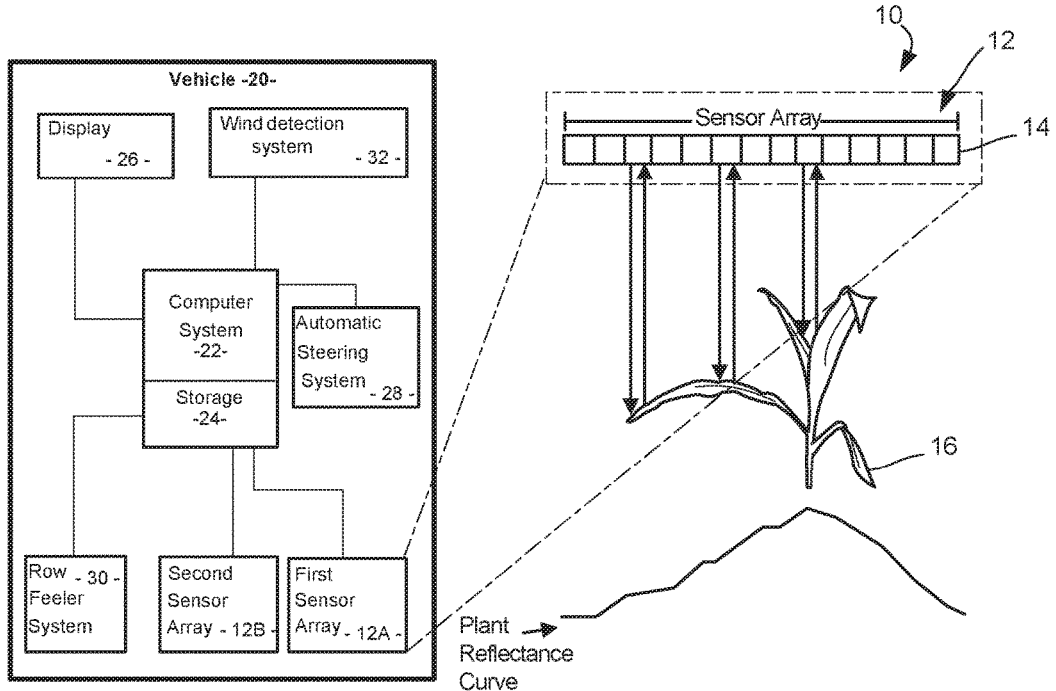
FIG. 3 is a further schematic diagram of the implementation of FIG. 1, showing a block diagram of the vehicle control systems.

As shown in the implementations of the calculation device, method and system 10 shown in FIGS. 1 and 3, an array 12 of active light sensors 16 is passed over a growing plant 16. Each sensor in the array 12 measures a reflectance value when it is over a part of the plant 16. The reflectance values are compiled to form a reflectance curve of the plant biomass. This reflectance curve is used in a variety of ways to determine cross track error from accurate measurements of the physical location of the plant row and to assist in guidance of an agricultural vehicle on which the array is mounted as it passes through a field of crops.

Figure 2:
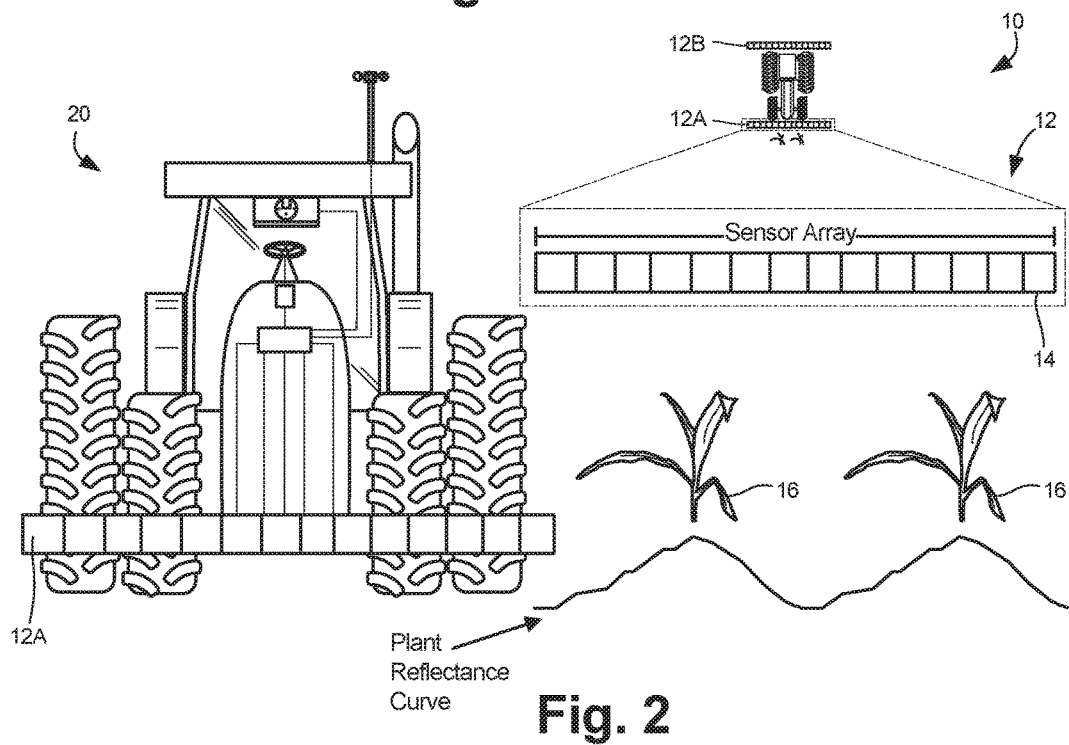
FIG. 2 is a schematic diagram of an array of sensors used to find the gap between rows by comparing reflectance curves, according to one implementation.
Figure 4:
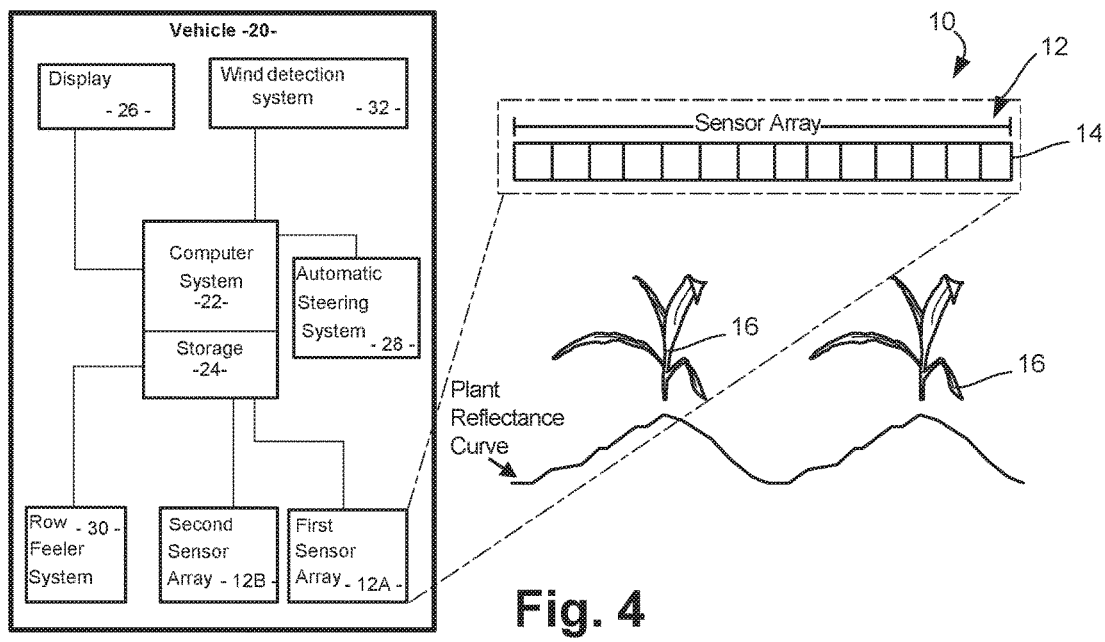
FIG. 4 is a further schematic diagram of the implementation of FIG. 2, showing a block diagram of the vehicle control systems.

In the implementation of the calculation device, method and system 10 shown in FIGS. 2 and 4, there is illustrated apparatus comprising an array 12 of sensors 14 that are used to find the gap between rows. If a crop type has little to no peak reflectance value at the center of the plant, sensors 14 can be used to indicate the total area of two plants. Knowing the gap between rows based on planter spacing, the system can calculate the center of the gap between rows to create a cross track error from.

In these and other implementations, the vehicle 20 has a computer system 22 configured to calculate a cross track driving error by determining the lateral relative position of vegetation as measured by the sensors to a ground engaging member of the vehicle 20. The computer system 22 includes a storage device 24, module or other device configured to store a Zero Error Position on the sensor array 12 that defines the vehicle is traveling the desired path whenever vegetation is passing under Zero Error Position. The computer system 22 also is used to determine the direction of cross track vehicle driving error by comparing the position on the active light sensor array 12 that vegetation is passing under to the Zero Error Position is used to determine the magnitude of cross track vehicle driving error by comparing the position on the active light sensor array that vegetation is passing under to the Zero Error Position, for example by adding the spacing between light sensors on said sensor array from where vegetation is passing under array to the Zero Error Position. In an exemplary embodiment, a display 26 is used to show an operator of the vehicle 20 the direction and magnitude of cross track vehicle driving error.

In another embodiment, the computer system 22 is interconnected with an automatic steering system 28 and uses the direction and magnitude of cross track vehicle driving error to automatically steer vehicle down a desired path. In this embodiment, a further refinement automatically determines when the cross track driving error from the active light sensor array 12 is sufficiently accurate to automatically engage steering.

In another embodiment, the computer system 22 accepts and uses a manual input to compensate direction and magnitude of cross track vehicle driving error for changes in vegetation biomass. For example, the manual input can be a user entered vegetation biomass parameter (e.g. growth stage, plant height).

In another embodiment, the computer system 22 automatically compensates the direction and magnitude of cross track vehicle driving error for changes in vegetation biomass using an algorithm that compensates for changing biomass by interpreting sensor signals without any user entered vegetation biomass parameters except for crop type.

A particular application of the disclosed implementations is detecting cross track driving error with the active light sensor array mounted to a vehicle used to detect the middle of a row space between adjacent rows; that is, using the array to identify adjacent rows of plants and calculating the line of halfway points. In another application of the disclosed implementations, the active light sensor array mounted on a vehicle is used to augment the cross track driving error of a parallel GPS manual guidance or automatic steering system, and may include comparing active light sensor readings to a GPS readings of a parallel guidance line system and/or comparing active light sensor readings of one row of crop to another row of crop sensed by the active light sensor array.

In another embodiment, the active light sensor readings from vegetation are compared to a mechanical row feeler system 30.

The disclosed implementations can be used to determine a cross track driving error by using the active light sensor array system to detect the location plants and compare it to the stored row spacing as planted, as well as verifying the location of two or more rows or one or more row spaces by comparing detected row space to actual planted row spacing.

The disclosed implementations can also be used to detect cross track driving error with the active light sensor array mounted on a vehicle by computing a rolling average of sensor readings in the direction of travel or, alternatively, computing an average from two or more sensors laterally positioned relative to the direction of travel.

The disclosed implementations can also be used to detect cross track driving error with an active light sensor array where system compensates for one or more wind parameters, such as wind speed and wind direction. In one such embodiment, the wind parameter is measured in real time on the vehicle 20 via a detection system 32 and wherein an algorithm uses the combination of wind parameters and sensor data to detect a row offset distance correction for cross track driving error.

The disclosed implementations can also be used to detect GPS drift based on plant row location compared to GPS created guidance line location. The invention shifts the GPS created guidance lines to the corrected location based on the location of the vehicle relative to the crop rows. In a preferred embodiment, an algorithm calculates a temporary correction for the guidance from a GPS created guidance line based on the sensor array detection of shifts in the plant rows.

The disclosed implementations can also be used to more accurately detect the path of the plants compared to the direction of travel of the vehicle by using at least two sensor arrays 12A, 12B over the same rows, as is shown in FIGS. 3-4. In this arrangement, the system 10 is able to more quickly respond to changes in path direction by calculating the difference in location between a front mounted and rear mounted array. The system 10 is thereby able to predict the path direction very near to the current location of the vehicle, which is especially useful for detecting when row of plants start to curve.

The disclosed implementations can also be used to correct cross track driving error for vegetation on slopes that do not grow perpendicular to soil surface by using slope readings from a real time slope sensor on the vehicle.

In various implementations, the cross track driving error of a mounted or drawn implement is determined for the purpose of either passively or actively steering the implement equipment.

The sensors preferably have a narrow and defined viewing area to determine an accurate amount of biomass directly in the viewing area of the sensor. The sensors also preferably sample data at a very high rate, even more preferably above 100 Hz.

The foregoing description and drawings comprise illustrative embodiments of the disclosed implementations. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art who have the disclosure before them will be able to make modifications and variations therein without departing from the scope of the invention.

We claim:

1. An apparatus for determining cross track error between a stored planted location and the actual physical location of plants, comprising:
    (a) an array of active light sensors suspended on a vehicle for travel above the plants;
    (b) an electrical signal from each sensor corresponding to the reflected light from the sensor;
    (c) a computer system for generating a reflectance curve from the array of sensors to determine the location of a plant below the array of sensors and for generating the cross track error; and
    (d) a mechanical row feeler system connected to the computer system and wherein the computer system compares the plant location information from the array of sensors and the plant location information from the mechanical row feeler system.

2. An apparatus for determining cross track error between a stored planted location and the actual physical location of plants, comprising:
    (a) an array of active light sensors suspended on a vehicle for travel above the plants;
    (b) an electrical signal from each sensor corresponding to the reflected light from the sensor;

(c) a computer system for generating a reflectance curve from the array of sensors to determine the location of a plant below the array of sensors and for generating the cross track error; and (d) a wind detection system connected to the computer system to provide information regarding at least one of wind speed and direction and wherein the computer system uses such wind information in the determination of cross track error.

3. The apparatus of claim 1, wherein the computer system differentiates between the reflected light off of plants and the reflected light off of soil.

4. The apparatus of claim 1, wherein the computer system differentiates between the reflected light off of crop plants and the reflected light off of foreign plants.

5. The apparatus of claim 1, further comprising an automatic steering system for the vehicle and interconnected with the computer system whereby the determined location of plants is used to automatically steer the vehicle.

6. The apparatus of claim 1, further comprising a second array of active light sensors spaced apart from the first array generally in the direction of travel of the vehicle.

7. The apparatus of claim 1, further comprising a display connected to the computer system for displaying to an operator of the vehicle the direction and magnitude of the cross track error.

8. The apparatus of claim 2, wherein the computer system differentiates between the reflected light off of plants and the reflected light off of soil.

9. The apparatus of claim 2, wherein the computer system differentiates between the reflected light off of crop plants and the reflected light off of foreign plants.

10. The apparatus of claim 2, further comprising an automatic steering system for the vehicle and interconnected with the computer system whereby the determined location of plants is used to automatically steer the vehicle.

11. The apparatus of claim 2, further comprising a second array of active light sensors spaced apart from the first array generally in the direction of travel of the vehicle.

12. The apparatus of claim 2, further comprising a display connected to the computer system for displaying to an operator of the vehicle the direction and magnitude of the cross track error.

\* \* \* \* \*